(12) United States Patent
Dozier, III et al.

(10) Patent No.: US 11,604,930 B2
(45) Date of Patent: Mar. 14, 2023

(54) GENERATION OF TRANSLATED ELECTRONIC DOCUMENT FROM AN INPUT IMAGE BY CONSOLIDATING EACH OF IDENTICAL UNTRANSLATED TEXT STRINGS INTO A SINGLE ELEMENT FOR TRANSLATION

(71) Applicant: Konica Minolta Business Solutions U.S.A., Inc., San Mateo, CA (US)

(72) Inventors: Mabry Frazier Dozier, III, Pensacola Beach, FL (US); Jason James Grams, Westminster, CO (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 406 days.

(21) Appl. No.: 16/586,175

(22) Filed: Sep. 27, 2019

(65) Prior Publication Data
US 2021/0097143 A1    Apr. 1, 2021

(51) Int. Cl.
| | |
|---|---|
| G06F 40/40 | (2020.01) |
| G06F 3/0485 | (2022.01) |
| G06F 40/47 | (2020.01) |
| G06F 40/42 | (2020.01) |
| G06F 40/166 | (2020.01) |
| G06V 10/40 | (2022.01) |
| G06V 30/148 | (2022.01) |

(52) U.S. Cl.
CPC ............ *G06F 40/42* (2020.01); *G06F 40/166* (2020.01); *G06V 10/40* (2022.01); *G06V 30/153* (2022.01)

(58) Field of Classification Search
CPC ......... G06F 40/40; G06F 3/0485; G06F 40/47

USPC .................................................. 704/5, 3, 4
See application file for complete search history.

(56) References Cited

U.S. PATENT DOCUMENTS

| | | | |
|---|---|---|---|
| 7,359,849 B2* | 4/2008 | Palmquist | G06F 40/40 |
| | | | 704/5 |
| 7,969,596 B2 | 6/2011 | Mathieson et al. | |
| 8,144,990 B2 | 3/2012 | Englund et al. | |
| 8,508,787 B2 | 8/2013 | Minhas | |
| 2003/0200078 A1 | 10/2003 | Luo et al. | |
| 2012/0245922 A1* | 9/2012 | Kozlova | G06F 3/0485 |
| | | | 704/3 |
| 2013/0282599 A1* | 10/2013 | Kang | G06Q 50/184 |
| | | | 705/310 |
| 2014/0006007 A1* | 1/2014 | Sumita | G06F 40/47 |
| | | | 704/4 |

FOREIGN PATENT DOCUMENTS

EP          1058896 B1     8/2005

* cited by examiner

*Primary Examiner* — Farzad Kazeminezhad
(74) *Attorney, Agent, or Firm* — Osha Bergman Watanabe & Burton LLP (57) ABSTRACT

A method of generating an editable translated electronic document from an input image of an original document with a first layout includes: segmenting the input image to generate a first region including first untranslated text; extracting, from the first region, the first untranslated text and a first layout information; generating an editable output data including the first untranslated text and the first layout information; translating the first untranslated text into a translated text; editing the output data to include the translated text; and generating, using the first layout information, the translated electronic document including the translated text and a second layout that is identical to the first layout.

11 Claims, 8 Drawing Sheets

Un presidente

Cuatro ochenta y siete años atrás, nuestros padres dieron a luz en este continente, una nueva nación, concebida en Libertad, y dedicada a la proposición de que todos los hombres son creados iguales.

| Ferrocarril | Emancipación | Enmiendas | Guerra civil |
|---|---|---|---|
| Preservación | Unión | Centavo | Honesto |
| Moneda | Mary Todd | Illinois | Cuarto de troncos |

Ahora estamos involucrados en una gran guerra civil, probando si esa nación, o cualquier nación tan concebida y dedicada, puede perdurar por mucho tiempo. Nos encontramos en un gran campo de batalla de esa guerra. Hemos llegado a dedicar una parte de ese campo, como un lugar de descanso final para aquellos que aquí dieron sus vidas para que esa nación pudiera vivir. Es totalmente apropiado y apropiado que hagamos esto.

Pero, en un sentido más amplio, no podemos dedicarnos, no podemos consagrarnos enNo podemos santificar este terreno. Los hombres valientes, vivos y muertos, que lucharon aquí, lo han consagrado, muy por encima de nuestro pobre poder para sumar o restar valor. El mundo se dará cuenta, ni recordará mucho lo que decimos aquí, pero nunca puede olvidar lo que hicieron aquí yoť s para nosotros los vivos, más bien, dedicarnos aquí al trabajo inacabado que los que lucharon aquí han avanzado hasta ahora noblemente yoť s más bien para nosotros estar aquí dedicados a la gran tarea que nos queda por delante; que de estos honrados muertos tomemos una mayor devoción a esa causa por la cual dieron la última medida completa de devoción, que aquí resolvamos altamente que estas muertes no han muerto en vano, que esta nación, bajo Dios, tenga un nuevo nacimiento de libertadusay el gobierno del pueblo, por el pueblo, porque el pueblo no perecerá de la tierra.

GENERATION OF TRANSLATED ELECTRONIC DOCUMENT FROM AN INPUT IMAGE BY CONSOLIDATING EACH OF IDENTICAL UNTRANSLATED TEXT STRINGS INTO A SINGLE ELEMENT FOR TRANSLATION

BACKGROUND

With the increasing extent and usage of the internet, opportunities for one user to exchange documents (e.g., correspond with, conduct business, exchange information) with another user are constantly increasing. In some cases, exchanged documents may be in a language that one user does not understand and translation of the documents is required. A mere translation of the text in the document may not be sufficient for a complete understanding of the document because contextual information in the structure or layout of the document may be lost in the translation process.

SUMMARY

In general, one or more embodiments the invention relate to a method for generating an editable translated electronic document from an input image of an original document with a first layout. The method includes: segmenting the input image to generate a first region comprising first untranslated text; extracting, from the first region, the first untranslated text and a first layout information; generating an editable output data comprising the first untranslated text and the first layout information; translating the first untranslated text into a translated text; editing the output data to include the translated text; and generating, using the first layout information, the translated electronic document comprising the translated text and a second layout that is identical to the first layout.

In general, one or more embodiments of the invention relate to non-transitory computer readable medium (CRM) storing computer readable program code for generating an editable translated electronic document from an input image of an original document with a first layout. The computer readable program code causes a computer to: segment the input image to generate a first region comprising first untranslated text; extract, from the first region, the first untranslated text and a first layout information; generate an editable output data comprising the first untranslated text and the first layout information; translate the first untranslated text into a translated text; edit the output data to include the translated text; and generate, using the first layout information, the translated electronic document comprising the translated text and a second layout that is identical to the first layout.

In general, one or more embodiments of the invention relate to a system for generating an editable translated electronic document from an input image of an original document with a first layout. The system includes: a memory; and a processor coupled to the memory. The processor: segments the input image to generate a first region comprising first untranslated text; extracts, from the first region, the first untranslated text and a first layout information; generates an editable output data comprising the first untranslated text and the first layout information; translates the first untranslated text into a translated text; edits the output data to include the translated text; and generates, using the first layout information, the translated electronic document comprising the translated text and a second layout that is identical to the first layout.

Other embodiments of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create a particular ordering of the elements nor to limit any element to being only a single element unless expressly disclosed, such as by the use of the terms "before," "after," "single," and other such terminology. Rather the use of ordinal numbers is to distinguish between the elements. By way of an example, a first element is distinct from a second element, and the first element may encompass more than one element and succeed (or precede) the second element in an ordering of elements.

In general, embodiments of the invention provide a method, a non-transitory computer readable medium (CRM), and a system for processing an image of an original document written in a first language with a first layout, translating the text of the original document into a different language, and generating/outputting an editable translated version of the original document in a second language with a second layout that is identical to the first layout of the original document.

In other words, when translating the text in the original document into a different language, retaining the structure of the original document may help improve a user's understanding of the original document. The original document conveys information in an understandable manner by including one or more text objects (e.g., characters, text strings, titles, paragraphs, captions, tables, etc.) and non-text objects (e.g., charts, graphs, images, clipart, or logos) in a structured format. For example, a block of text describing a picture may be placed next to the picture as a caption. In the translated electronic version of the original document, the translated text may be placed in the same position relative to the picture such that the user understands that the translated text is the caption for the picture.

In one or more embodiments, one or more processes applying a combination of visual and semantic analyses are executed to segment the image of the original document and obtain one or more regions of the original document. Each region contains an object (e.g., untranslated text or non-text object) and a layout information that describes the object and/or how the object is oriented or positioned in the structure of the original document. By processing and preserving the structure of the original document when translating the original text, it is possible to generate an editable translated version of the original document that would be easier for a user to understand.

Figure 1:
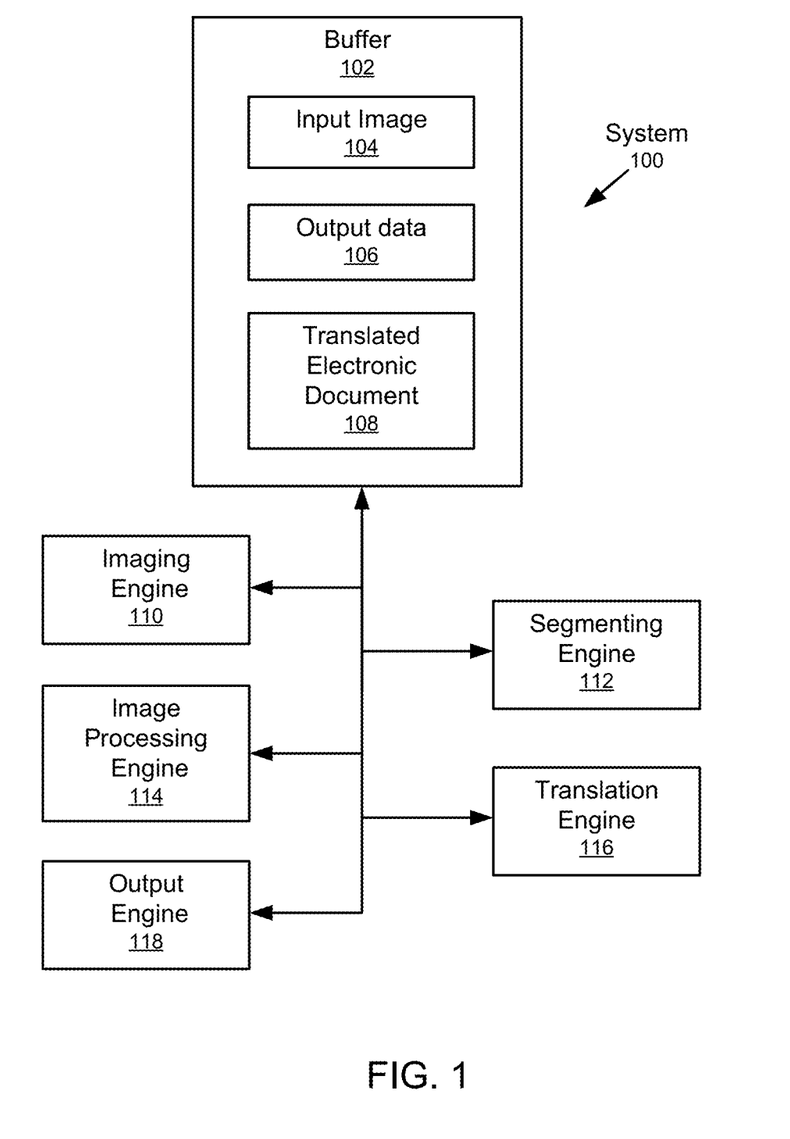
FIG. 1 shows a system in accordance with one or more embodiments of the invention.

FIG. 1 shows a system 100 in accordance with one or more embodiments of the invention. As shown in FIG. 1, the system 100 has multiple components, including, for example, a buffer 102, an imaging engine 110, a segmenting engine 112, an image processing engine 114, a translation engine 116 (a translator), and an output engine 118. Each of these components (102, 110, 112, 114, 116, and 118) may be located on the same computing device (e.g. personal computer (PC), laptop, tablet PC, smartphone, multifunction peripheral device, Projection with Interactive Capture (PIC) device, kiosk, server, etc.) or on different computing devices connected by a network of any size having wired and/or wireless segments. Each of these components is discussed below.

The system 100 includes the buffer 102. The buffer 102 may be implemented in hardware (i.e., circuitry), software, or any combination thereof. The buffer 102 is configured to store an input image 104 including one or more original documents. The input image 104 may be obtained (e.g., downloaded, scanned, imaged, etc.) from any source by the imagine engine 110. The input image 104 may be a single image or multiple images of a single-page document or a multi-paged document. The input image 104 may be of any size and in any format (e.g., BMP, JPEG, PNG, GIF, etc.). The input image 104 includes a first region comprising a first untranslated text. The first untranslated text may be part of the main body of an original document (e.g., free flowing text block) or embedded within other graphical elements of the original document (e.g., text embedded within a graphic).

The buffer 102 is also configured to store an output data 106. The output data 106 may be editable (i.e., items may be altered, added, or removed) and may include untranslated text, translated text, non-text objects, and layout information of regions extracted from the input image 104. Layout information may include a shape, a size, a width, a height, a relative position, a number of rows (e.g., rows in a table or lines in a paragraph), a number of columns (e.g., columns in a table or text columns in a page), a font, a text attribute (e.g., justification, boldness, strike-through, etc.), a line spacing, a margin, a text direction (e.g. horizontal or vertical), a wrap type (i.e., how text flows around objects), or any appropriate information that describes the layout of a region and/or an object within the region. The output data 106 may be generated, edited, and/or deleted by the imaging engine 110, segmenting engine 112, image processing engine 114, translation engine 116, output engine 118, or any combination thereof.

The buffer 102 is also configured to store the editable translated version of the original document as a translated electronic document (TED) 108. The TED 108 may be editable and include one or more text objects (e.g., a text character, a text string, a title, a paragraph, a table) and non-text objects (e.g., an image, a graphic, a chart, a graph, etc.). The TED 108 may be generated by the output engine 118. The TED 108 may be a single-paged document or a multi-paged document. Further, the TED 108 may be of any size and in any format (e.g., PDF, OOXML, ODF, HTML, etc.). Generally, the TED 108 contains the same content as the original document, in a second layout that is identical to the first layout of the original document, but with at least a portion of an original untranslated text replaced with a translated text.

The system 100 further includes the imaging engine 110. The imaging engine 110 may be implemented in hardware (i.e., circuitry), software, or any combination thereof. The imaging engine 110 is configured to obtain the input image 104. For example, the imagining engine 110 may scan an original document in a scanner, image the original document with a digital camera or with PIC device, or download an image file from a storage device or server to obtain the input image 104. Alternatively, the imaging engine 110 may obtain the input image 104 from any source and is not limited to the above methods. Furthermore, the imaging engine 110 may generate, edit, and/or delete any appropriate layout information in the buffer 102.

The system 100 further includes the segmenting engine 112. The segmenting engine 112 may be implemented in hardware (i.e., circuitry), software, or any combination thereof. The segmenting engine 112 is configured to segment the input image 104 and generate one or more regions. For example, the segmenting engine 112 may perform one or more visual or semantic analyses to determine one or more regions of the input image 104. Visual or semantic analysis may be applied using a system, a program, a software, or any combination thereof that is able to accurately parse regions of the input image 104.

Each region may include a text object, a non-text object, or any combination thereof. A region may be further segmented into additional regions based on the objects within the region (e.g., cells of a table). The regions of the input image 104 may be stored in the buffer 102. Furthermore, the segmenting engine 112 may generate, edit, and/or delete the layout information in the buffer 102.

The system 100 further includes the image processing engine 114. The image processing engine 114 may be implemented in hardware (i.e., circuitry), software, or any combination thereof. The image processing engine 114 is configured to perform image processing on the regions of the input image 104 to extract untranslated text and/or layout information from these regions and store the text and/or layout information in the buffer 102. The image processing engine 114 may perform optical character recognition (OCR) or intelligent character recognition (ICR) to recognize and extract text from the regions of the input image 104. Furthermore, based on the image processing of the input image 104 or the regions of the input image 104, the imaging engine 110 may generate, edit, and/or delete any appropriate text or layout information in the buffer 102.

The system 100 further includes the translation engine 116. The translation engine 116 may be implemented in hardware (i.e., circuitry), software, or any combination thereof. The translation engine 116 is configured to translate text from the first language into a second language different from the first language. In some cases, the translation engine 116 translates the first language into a different form of the first language (e.g., from traditional Chinese characters to simplified Chinese characters). The translation engine 116 may comprise a local process, a cloud-based translation service, or any combination thereof.

In one or more embodiments, the translation engine 116 translates the untranslated text stored in the output data 106 from the first language into a second language and include the translated text in the output data 106. The translation engine 116 may translate the translated text from the second language back into the first language and include the re-translated text in the output data 106. Furthermore, the translation engine 116 may generate, edit, and/or delete any appropriate text or layout information in the buffer 102.

The system 100 further includes the output engine 118. The output engine 118 may be implemented in hardware (i.e., circuitry), software, or any combination thereof. The output engine 118 is configured to control interactions between the buffer 102 and the various engines 110, 112, 114, 116 to generate the TED 108. For example, the output engine 118 uses the translated text, the layout information, and/or the non-text objects included in the output data 106 to generate the TED 108 with an identical layout as the first layout of the original document. Furthermore, the output engine 118 may generate, edit, and/or delete any appropriate text or layout information in the buffer 102.

Although the system 100 is shown as having six components 102, 110, 112, 114, 116, and 118, in other embodiments of the invention, the system 100 may have more or fewer components. Further, the functionality of each component described above may be split across components or combined in a single component. Further still, each component 102, 110, 112, 114, 116, and 118 may be utilized multiple times to carry out an iterative operation.

In one or more embodiments, the system 100 may work as a component of a larger document processing system. For example, the system 100 may be coupled to another product or system (e.g., a PIC device, a multi-function peripheral, etc.) that generates input images or manages/manipulates electronic documents.

Figure 2A:
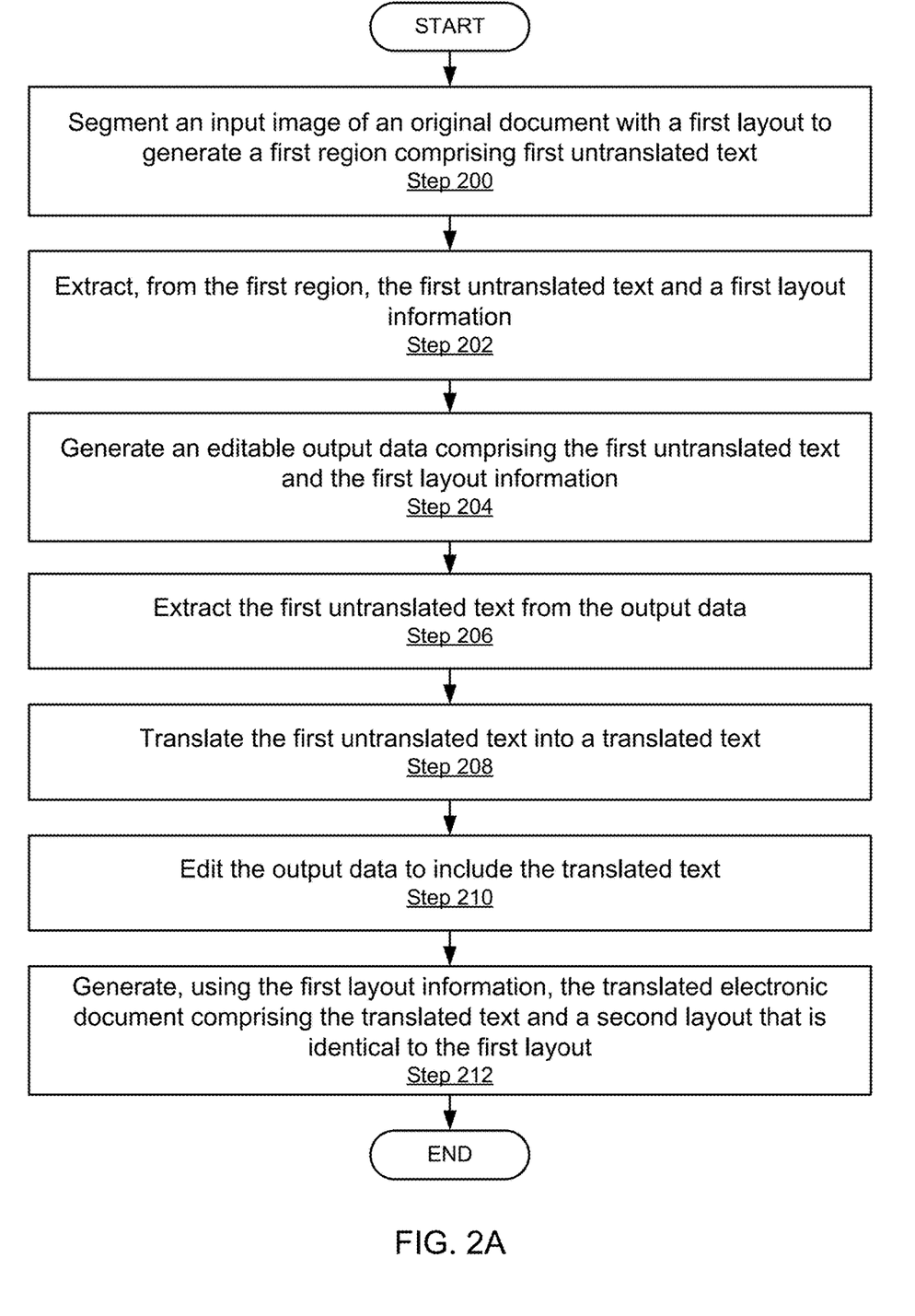
FIGS. 2A and 2B show flowcharts in accordance with one or more embodiments of the invention.

FIG. 2A shows a flowchart in accordance with one or more embodiments of the invention. The flowchart depicts a method for generating a TED from an input image with a first region. The method in FIG. 2A may be performed by one or more components of the system 100 described above in reference to FIG. 1. In one or more embodiments of the invention, one or more of the steps shown in FIG. 2A may be combined, omitted, repeated, and/or performed in a different order than the order shown in FIG. 2A. Accordingly, the scope of the invention should not be considered limited to the specific arrangement of steps shown in FIG. 2A.

In STEP 200, an input image 104 of an original document with a first layout is segmented by the segmenting engine 112 to generate a first region comprising a first untranslated text. Prior to segmentation, the input image 104 may be obtained (e.g., downloaded, scanned, imaged, etc.) by the imaging engine 110 from any source.

In one or more embodiments, discussed below with respect to FIG. 2B, the input image 104 may include a plurality of regions (e.g., a first region, a second region, etc.), each region comprising an untranslated text (e.g., a first untranslated text, a second untranslated text, etc.).

In STEP 202, the image processing engine 114 extracts the first untranslated text and a first layout information from the first region. Image processing may include OCR, ICR, or any appropriate image processing technique to recognize and extract text and/or layout information from an image. The imaging engine 114 may extract a text-content information (e.g., text characters, text strings, etc.), text styling attributes (e.g., font, size, color, boldness, italics, etc.), and/or other appropriate properties of the first untranslated text. The first layout information may include a position in the first region, a position in the input image 104, a text justification, a number of columns, a number of rows or lines, a line spacing, etc.

As a first non-limiting example, a region may correspond to an introduction section of the original document and thus may include a title and a paragraph (i.e., collectively the first untranslated text). In addition to the first untranslated text comprising the title and the paragraph, the image processing engine 114 may extract a first layout information comprising a spacing of the title from the paragraph and different styling attributes (e.g., boldness and font size) for both the title and the paragraph.

As a second non-limiting example, a region may correspond to a table of information in the original document, each cell of the table including text (i.e., collectively the first untranslated text) and/or non-text characters. The image processing may recognize the table and extract the first untranslated text along with a first layout information comprising the size, position, number of rows, number of columns of the table, the relative location of each text string within the table, etc.

As a third non-limiting example, a region may correspond to a graphical object containing text (i.e., the first untranslated text is embedded in a graphic). The image processing engine 114 may recognize the text embedded in the graphic and extract the first untranslated text along with a first layout information comprising a relative location within the graphic, an orientation, a skew, etc.

In STEP 204, an editable output data (i.e., the output date 106 discussed above in reference to FIG. 1) comprising the first untranslated text and the first layout information is generated. In other words, the first region of the input image 104 is converted into editable data by the image processing engine 114 and is saved in a buffer 102 as part of the output data 106.

In STEP 206, the first untranslated text is extracted from the output data 106. The first untranslated text may be compiled into a translation list. The translation list may comprise one or more text strings that correspond to various parts of the first untranslated text. Constructing the translation list may be a recursive process if data is nested within the output data 106 (e.g., a paragraph is broken into sentences, a sentence is broken into words, cells of a table, etc.). The translation list may be reduced in size by consolidating identical entries.

In the first non-limiting example of a region comprising a title and a paragraph, the translation list may contain two text strings: one for the title; and one for the paragraph. Alternatively, a plurality of text strings may be used to represent one or a combination of the untranslated texts in the paragraph (e.g., one text string for each word or sentence).

In the second non-limiting example of a region comprising a table, the translation list may comprise a plurality of text strings that correspond to each cell of the table that contains text.

In the third non-limiting example of a region comprising a graphic containing text, the translation list may comprise one or more text strings that correspond to each instance of text embedded in the graphic.

Once the translation list has been compiled, the translation list may be submitted to a translation engine 116, as discussed above in reference to FIG. 1, as a single instruction. If the translation engine 116 is stored locally, submitting all of the untranslated text as a single instruction advantageously reduces the processing overhead compared to submitting multiple requests (e.g., each text string being submitted individually). If the translation engine 116 is stored remotely in a cloud or remote-based system, submitting all of the untranslated text as a single instruction advantageously reduces network latency and congestion.

In STEP 208, the translation engine 116 translates the first untranslated text into a translated text. Subsequently, the translation engine may output the translated text as a single output to reduce processing overhead and/or network latency and congestion. The translation engine 116 may also construct a translation map that associates each untranslated text string in the translation list with the corresponding translated text string in the translated text. The translation map may be reduced in size by consolidating identical entries.

In STEP 210, the output data 106 is edited to include the translated text. The output data 106 may be edited to also include the translation map to describe the relationship between the first untranslated text and the translated text.

In STEP 212, the output engine 118 generates, using the first layout information, the TED 108 comprising the translated text and a second layout that is identical to the first layout. The first region may be recreated in the TED 108 using the output data 106 (e.g., the translated text, the first layout information, the translation list, the translation map, and/or any non-text objects from the first region). The output engine 118 may use the translation list and the translation map to replace the first untranslated text with the corresponding translated text.

The replacement of the first untranslated text may be performed in the order of the text strings of the translation list (i.e., each text string is identified in the first untranslated text and sequentially replaced). Alternatively, if a particular text string is repeated throughout the first untranslated text (e.g., identical cells of a table), the particular string may be replaced multiple times before proceeding to the next text string in the translation list. However, the invention is not limited to the order of operations described above and replacing the translated text may be performed using any appropriate method and in any appropriate order.

The output engine 118 uses the first layout information to retain the original formatting of the original document when replacing the first untranslated text. The output engine 118 may use the same shape, width, height, relative position, or any combination thereof when recreating the first region. Furthermore, the output engine 118 may use the same font, and/or text attributes (e.g., justification, boldness, strikethrough, etc.) when replacing the first untranslated text with the translated text.

In the first non-limiting example of a region comprising a title and a paragraph, the output engine 118 uses the translation map and the first layout information to recreate the spacing and relative position of the title and the paragraph. For example, if the original title was bolded and centered above the original paragraph, the translated title may have the same bolded font and may be centered over the translated paragraph in the same manner as the original document. Accordingly, the user can easily recognize the emphasized text in the TED 108 as the title of the TED 108.

In the second non-limiting example of a region comprising a table, the output engine 118 uses the translation map and the first layout information to recreate the original table using the same number of rows and columns before replacing the first untranslated text in each cell with the corresponding translated text. Accordingly, the user can reference the table in the TED 108 using the same table coordinates as the original document.

In the third non-limiting example of a region comprising an image containing text, the output engine 118 uses the translation map and the first layout information to recreate the image with the translated text. The output engine 118 may directly modify the image (i.e., by pixel manipulation) to include the translated text or may simply position a text box containing the translated text to cover the first untranslated text in the image.

In general, the output engine 118 creates the TED 108 with a second layout that is identical to the first layout of the original document. Alternatively, slight differences in the structure of the TED 108 may be introduced by changing one or more elements of the first layout information to ensure the second layout is identical to the first layout. In this application, an identical layout means that the relative relationships between text objects and non-text objects are the same in both the first and second layout. Even if slight differences exist between a region in the first layout and the corresponding region in the second layout (e.g., change in height/width of the region), the first and second layout may still be identical.

For example, an untranslated text string, contained within an untranslated text box in the original document, is translated into a corresponding translated text string that is longer than the original untranslated text string. The output engine 118 may create a translated text box in the TED 108 that wraps the translated text onto an additional line. Thus, the translated text box in the identical second layout may have the same width but a larger overall height compared to the untranslated text box in the first layout. Similarly, the output engine 118 may adjust the absolute position of objects around the translated text box in the identical second layout to retain the relative positioning of objects in the first layout of the original document.

In one or more embodiments, the first untranslated text may be retained in the TED 108. For example, the first untranslated text may be replaced by the corresponding translated text using a feature that tracks edits in the TED 108 (i.e., the first untranslated text is visible in the TED 108 but is marked or tagged for deletion).

After the translated text has replaced the first untranslated text, the first untranslated text may be added to the TED 108 as an annotation. For example, the output engine 118 may retain the first untranslated text in the TED 108 by adding one or more comment bubbles containing the first untranslated text. Alternatively, the output engine 118 may include a re-translated text (i.e., a translation of the translated text into the language of the untranslated text) into the TED 108 by adding one or more comment bubbles containing the re-translated text. In addition, the output engine 118 may retain the first untranslated text in the margins (e.g., as a footnote or header) of the TED 108.

By having the text of the original document appear in both the translated and untranslated/re-translated forms in the TED 108, a user may more easily confirm the accuracy of the translation engine 116. Furthermore, the user may be able to revise parts of the TED 108 if needed (e.g., an obvious translation error occurs).

Furthermore, the output engine 118 may generate, using the first layout information, an editable untranslated electronic document that is output with the TED 108. The untranslated electronic document is editable and comprises the untranslated text in the first layout. In other words, the untranslated electronic document is an editable electronic form of the original document. By outputting the TED 108 and the untranslated electronic document, the user can directly compare an editable electronic version of the original document and the TED 108.

Figure 2B:
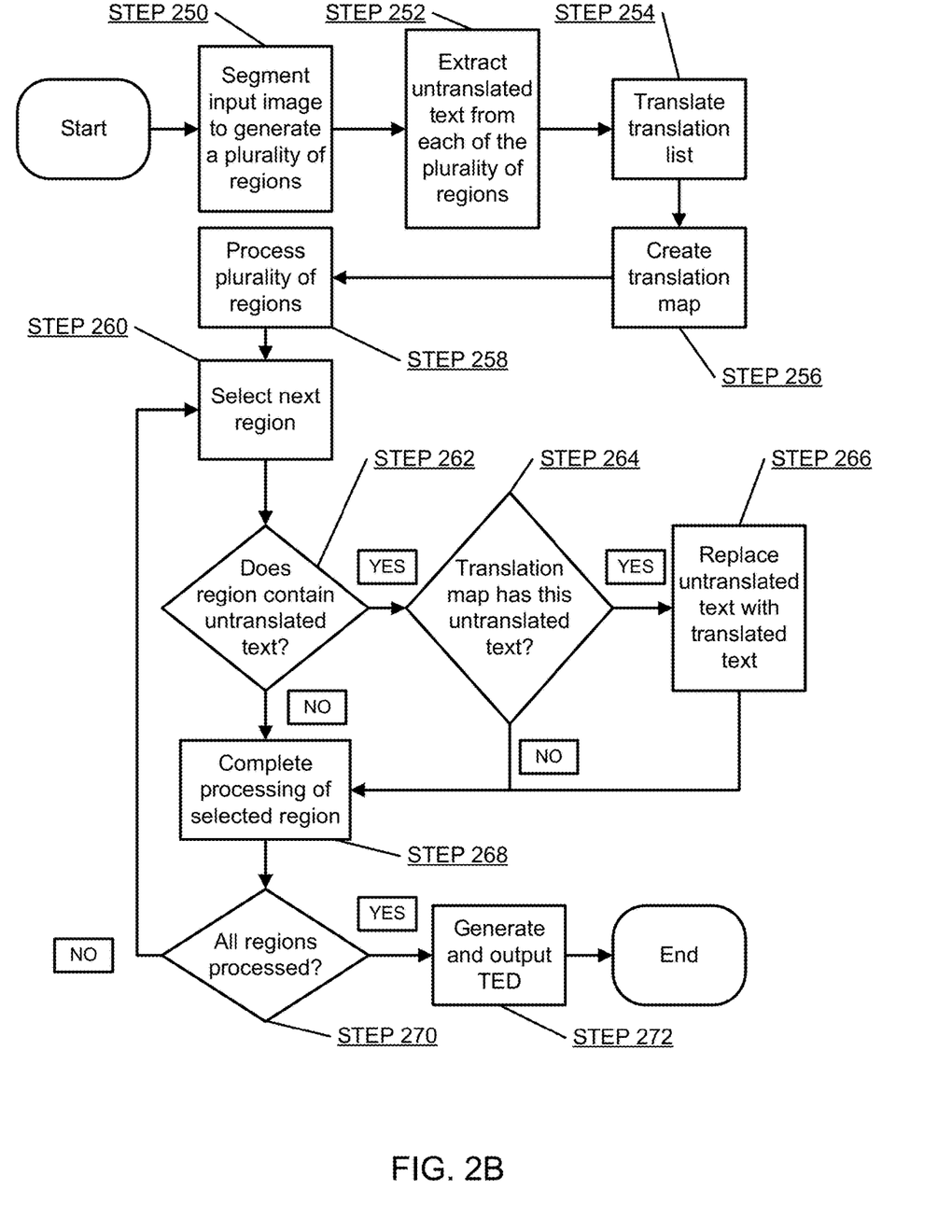

FIG. 2B shows a flowchart in accordance with one or more embodiments of the invention expanding on the case of an input image that includes a plurality of regions comprising the first region and a second region comprising a second untranslated text. Similar to the method in FIG. 2A, the method in FIG. 2B may be performed by one or more components of the system 100 described above in reference to FIG. 1. In one or more embodiments of the invention, one or more of the steps shown in FIG. 2B may be combined, omitted, repeated, and/or performed in a different order than the order shown in FIG. 2B. Accordingly, the scope of the invention should not be considered limited to the specific arrangement of steps shown in FIG. 2B.

In STEP 250, the segmenting engine 112 segments the input image 104 to generate the plurality of regions (i.e., a first region, a second region, etc.) and creates a region list that includes each of the plurality of regions.

In STEP 252, the image processing engine 114 extracts an untranslated text and a layout information from each of the plurality of regions (i.e., the first untranslated text, the second untranslated text, the first layout information, the second layout information, etc.) in the region list, includes each of the plurality of untranslated texts and each of the plurality of layout information in the output data 106. Each of the plurality of untranslated texts is extracted from the output data 106, without the corresponding layout information, and compiled into a translation list.

In STEP 254, the translation list is submitted to the translation engine 116 as a single instruction or as multiple instructions and the translation engine 116 returns the translated text as a single output. The translated text includes a translation of each untranslated text.

In STEP 256, the translation engine 116 creates a translation map that associates (i.e., maps) each of the plurality of untranslated texts with the corresponding translated text.

In STEP 258, the output engine 118 iteratively processes each region in the region list.

In STEP 260, the output engine 118 selects the next region to be processed from the region list.

In STEP 262, the output engine 118 determines if the selected region contains untranslated text (e.g., by referencing the translation list, parsing the selected region, etc.). If the determination in STEP 262 is NO, the process continues to STEP 268.

If the determination in STEP 262 is YES, the process continues to STEP 264 where the output engine 118 determines if the translation map comprises the untranslated text from STEP 262. If the determination in STEP 264 is NO (e.g., the translation engine failed), the process continues to STEP 268 and the untranslated text remains in the TED 108. In one or more embodiments, the untranslated text may be annotated with a text attribute or special character to indicate that the translation step failed.

If the determination in STEP 264 is YES, the process continues to STEP 266 where the output engine 118 edits the output data 106 to include, using the translation map, the translated text that corresponds to each of the plurality of untranslated texts.

In STEP 268, the output engine 118 completes processing of the currently selected region.

In STEP 270, the output engine 118 determines if the processing of each of the plurality of regions in the region list is complete. If the determination in STEP 270 is NO, the process continues to STEP 260 where the next region is selected for processing.

If the determination in STEP 270 is YES, the process continues with STEP 272 where the output engine 118 generates, using each of the plurality of layout information extracted by the various engines 110, 112, 114, 116, and 118, the TED 108 comprising the translated text and a second layout that is identical to the first layout based upon the extracted layout information. Each of the plurality of regions included in the region list may be recreated in the TED 108 using the output data 106 (e.g., translated text, layout information, the translation list, the translation map, and/or any non-text objects from each region). The output engine 118 may use the translation list and the translation map to replace each of the plurality of untranslated texts with the corresponding translated text. The TED 108 may be output to the user in any format.

In general, the output engine 118 creates the TED 108 with a second layout that is identical to the first layout of the original document. Alternatively, slight differences in the second layout may be introduced (e.g., a change in length of a text string during translation into another language) but the output engine 118 may maintain the first layout and relationship between text objects and non-text objects by changing one or more elements of the first layout information. For example, when a translated text string is longer than the original first untranslated text string, the output engine 118 may wrap the translated text onto an additional line (i.e., increase the height of the translated text box) in order to maintain the width of the first untranslated text box.

Figure 3:
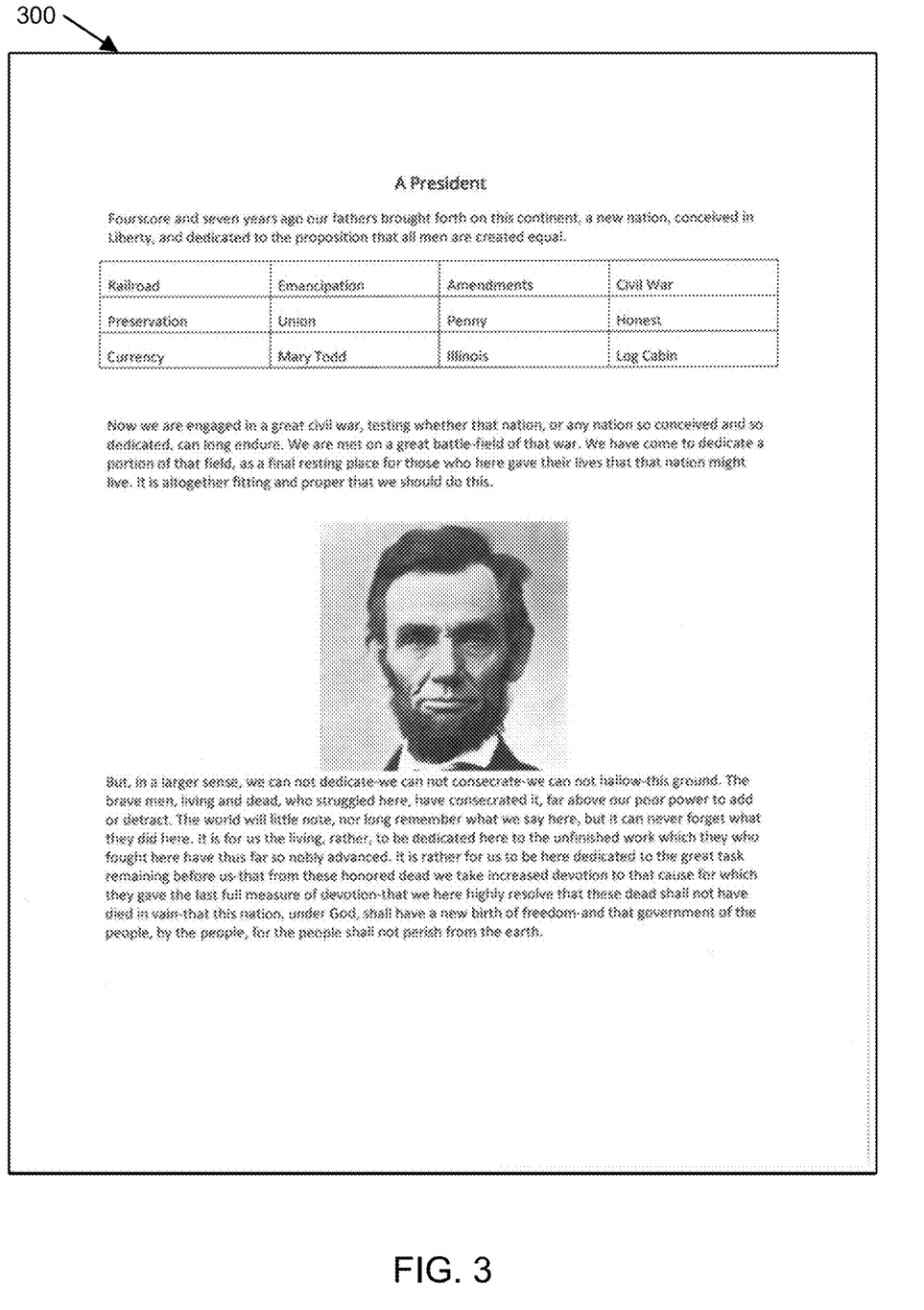
FIG. 3 shows an original document in accordance with one or more embodiments of the invention.

FIGS. 3-5A show an implementation example according to one or more embodiments of the invention. As shown in FIG. 3, an original document 300 may be a single-paged document structured with multiple regions to convey various information in a first language (i.e., English). In this example, the original document 300 comprises: a first region including a title and a first paragraph; a second region including a table of text strings; a third region including a second paragraph; a fourth region including an image; and a fifth region including a third paragraph.

Figure 4:
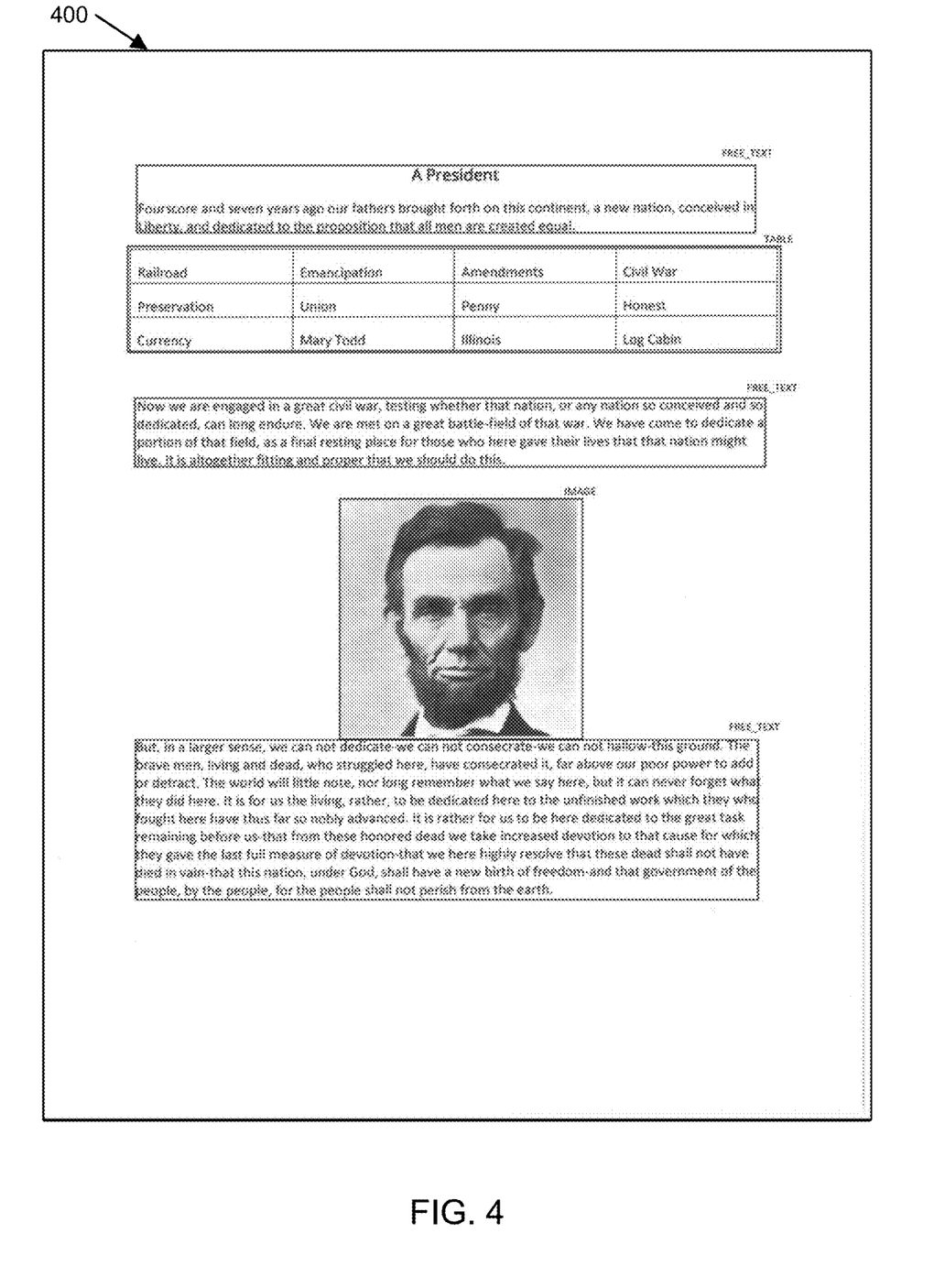
FIG. 4 shows an input image in accordance with one or more embodiments of the invention.

FIG. 4 shows an input image 400 in accordance with one or more embodiments of the invention generated from the original document 300. The original document 300 may be scanned into a bitmap image (or any appropriate image format) as the input image 400. The input image 400 is segmented to generate the first through fifth regions, as indicated by the solid lines bounding each region. In one or more embodiments, each region may be labeled and/or tagged according to the objects contained within the region (e.g., a free text, an image, etc.). Based on the boundaries of each of the regions, a layout information for each region may be generated and stored as output data.

Figure 5A:
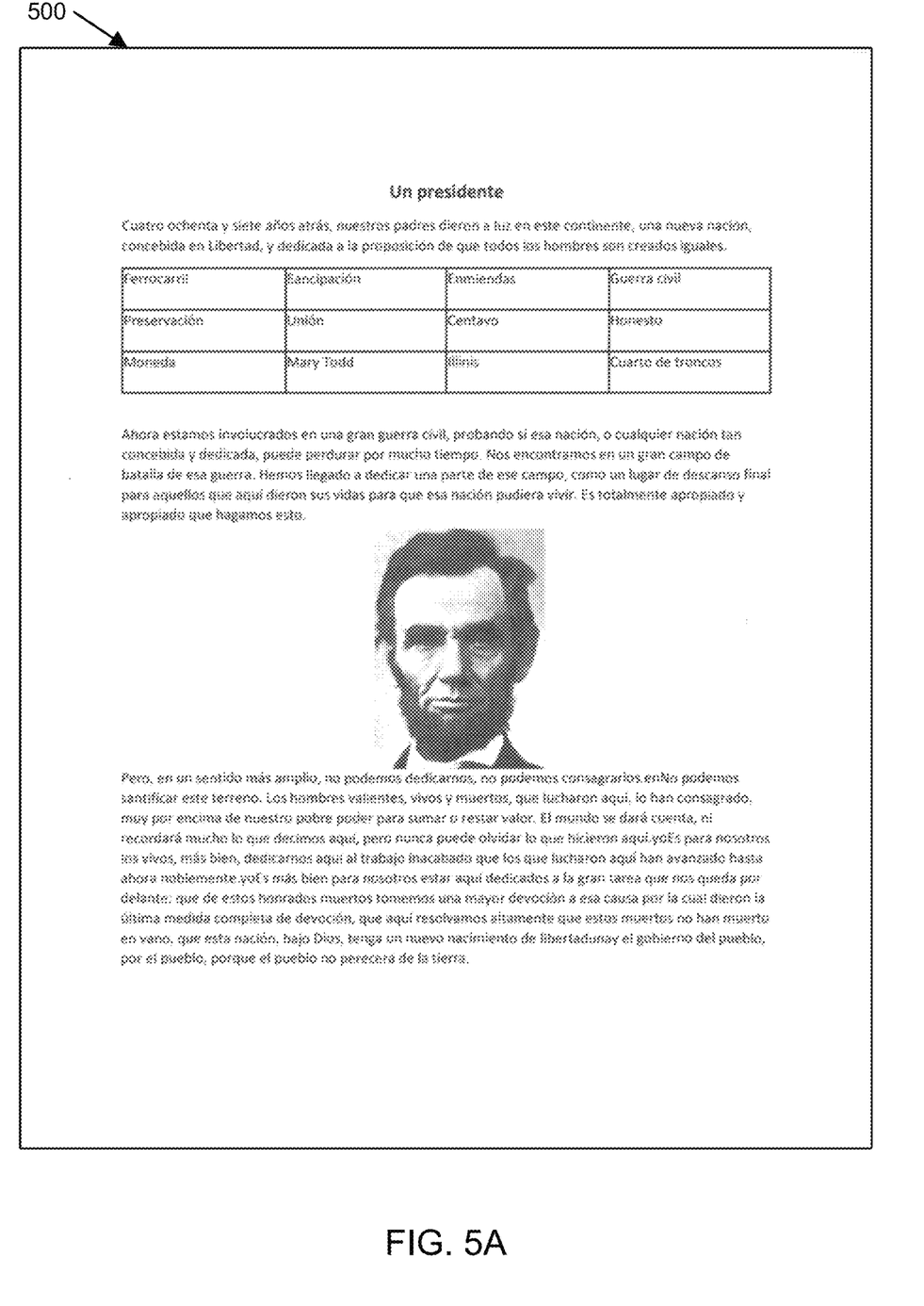
FIG. 5A shows a translated electronic document in accordance with one or more embodiments of the invention.

FIG. 5A shows a translated electronic document (TED) 500 in accordance with one or more embodiments of the invention. The process of one or more embodiments discussed above in reference to FIGS. 2A and 2B is executed on the input image 400 to generate the TED 500. The resulting TED 500 may vary depending on the type of image processing used on input image 400 and the semantics of the second language of the translated text. However, the TED 500 retains the first layout and relative relationships between text objects and non-text objects of the original document 300.

Figure 5B:
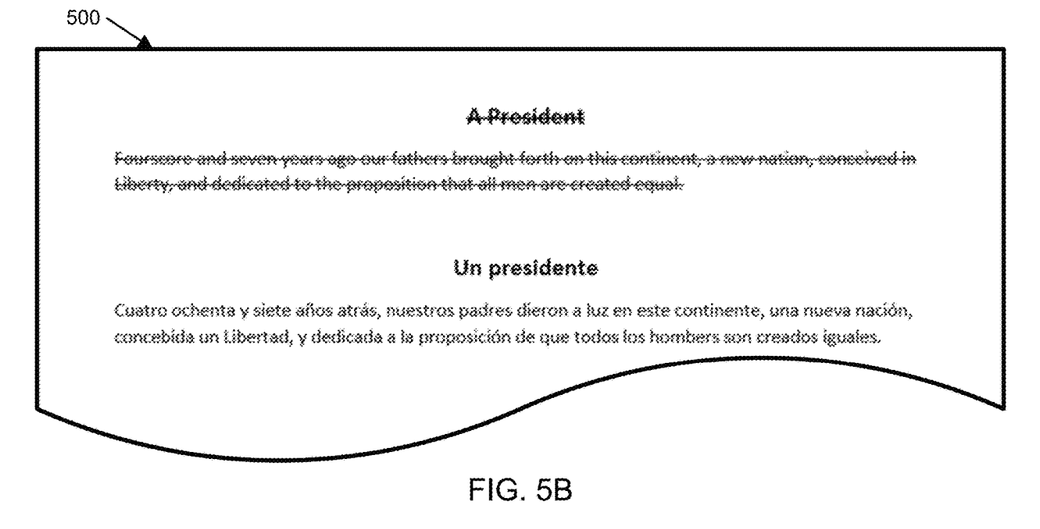
FIGS. 5B and 5C show a portion of a translated electronic document in accordance with one or more embodiments of the invention.
Figure 5C:
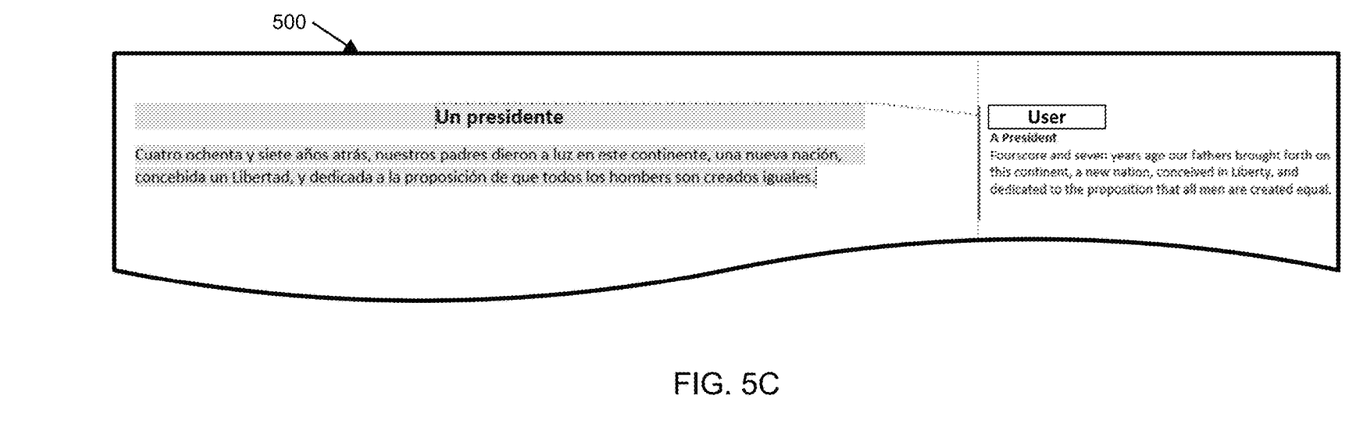

FIGS. 5B-5C show a portion of a TED 500 that further comprises the first untranslated text. As shown in FIG. 5B, a TED 500 may retain the untranslated text as an annotated text using a feature that tracks edits in the TED 500 (i.e., the untranslated text is visible in the TED 500 but is marked or tagged for deletion). As shown in FIG. 5C, a TED may retain the untranslated text by replacing the untranslated text with the translated text and adding the untranslated text (or re-translated text) into the TED 500 as an annotation (e.g., a comment bubble).

Figure 6:
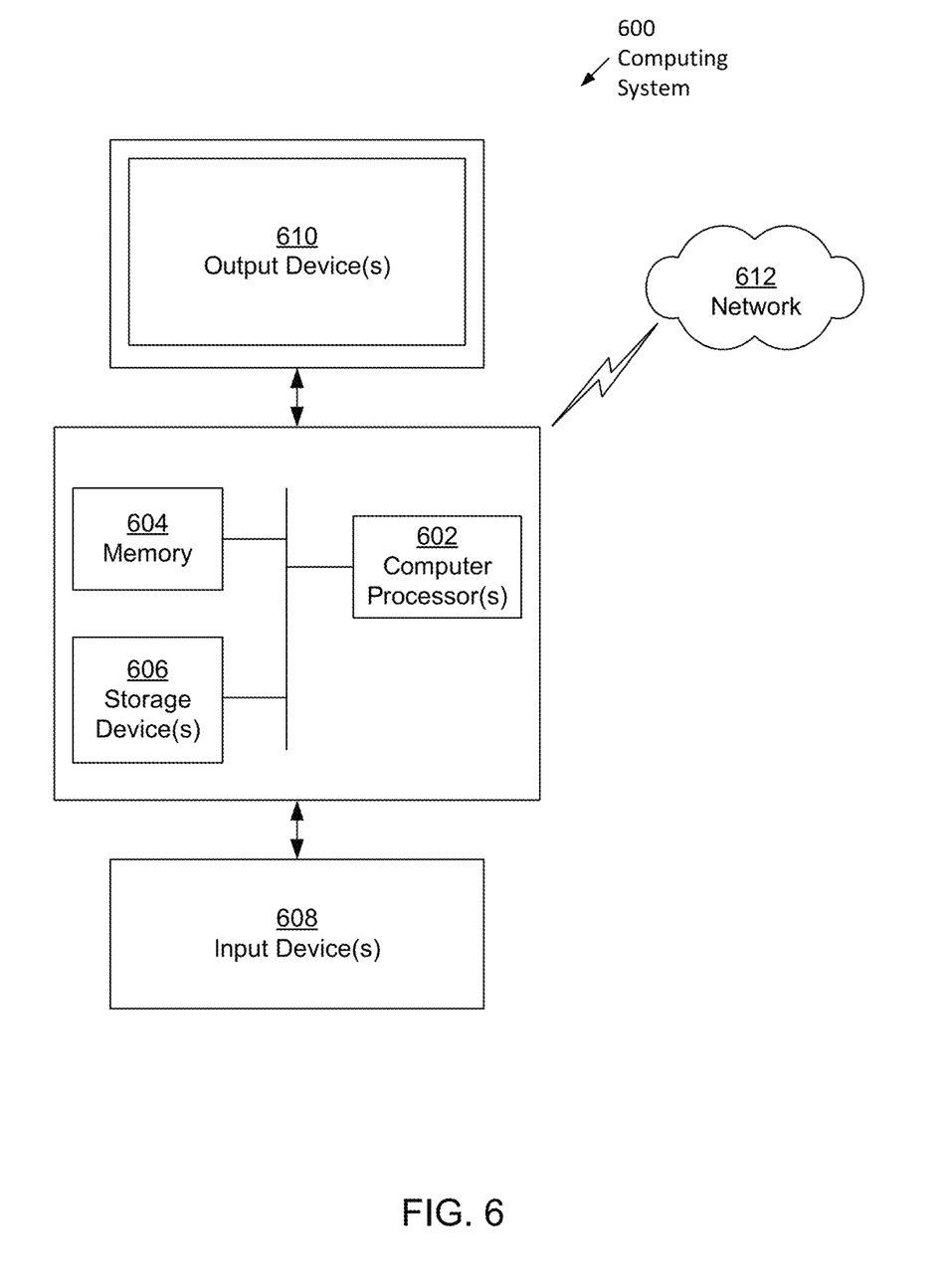
FIG. 6 shows a computing system in accordance with one or more embodiments of the invention.

The method of generating the translated electronic document according to one or more embodiments may be implemented on virtually any type of computing system, regardless of the platform being used. For example, the computing system may be one or more mobile devices (e.g., laptop computer, smartphone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system 600 may include one or more computer processor(s) 602, associated memory 604 (e.g., random access memory (RAM), cache memory, flash memory, etc.), one or more storage device(s) 606 (e.g., a hard disk, an optical drive such as a compact disk (CD) drive or digital versatile disk (DVD) drive, a flash memory stick, etc.), and numerous other elements and functionalities. The computer processor(s) 602 may be an integrated circuit for processing instructions. For example, the computer processor(s) may be one or more cores, or micro-cores of a processor (e.g., a CPU (central processing unit), GPU (graphics processing unit), etc.).

The computing system 600 may also include one or more input device(s) 608, such as a touchscreen, keyboard, mouse, microphone, touchpad, electronic pen, imaging engine (e.g., a scanner or digital camera, a PIC device), or any other type of input device. Further, the computing system 600 may include one or more output device(s) 610, such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system 600 may be connected to a network 612 (e.g., a local area network (LAN), a wide area network (WAN) such as the Internet, mobile network, or any other type of network) via a network interface connection (not shown). The input and output device(s) may be locally or remotely (e.g., via the network 612) connected to the computer processor(s) 602, memory 604, and storage device(s) 606. Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system 600 may be located at a remote location and be connected to the other elements over a network 612. Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

One or more of the embodiments of the invention may have one or more of the following advantages and improvements over conventional document processing and translation technologies: facilitating the exchange of information between users with different native languages; generating an editable translated electronic document while retaining the first layout of the original document to reduce the loss of contextual information during the translation process; retaining the untranslated text in the translated electronic document (e.g., by generating one or more electronic documents with the text in both the first and second languages); reducing contextual translation errors in translated electronic documents; and reducing processing and communication costs by performing a single translation process. One or more of the above advantages may improve a user's understanding of the contents of the original document and/or allow a user fluent in both the first and second languages to verify the translation results and easily edit the translated electronic document to increase the accuracy of the translation.

Although the disclosure has been described with respect to a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A method of generating an editable translated electronic document from an input image of an original document with a first layout, the method comprising:
    obtaining the input image using a camera or a scanner to image the original document;
    segmenting the input image to generate regions including a first region comprising first untranslated text and a second region comprising a second untranslated text;
    generating a region list that includes each of the regions;
    extracting, using an image recognition algorithm, untranslated text and layout information from each of the regions, where the first untranslated text and a first layout information are extracted from the first region and the second untranslated text and a second layout information are extracted from the second region;
    processing the untranslated text from each of the regions to create a translation list of non-repeated text strings, where identical text strings that are repeated in the untranslated text of all the regions are consolidated into a single element of the translation list and each element of the translation list is one of the non-repeated text strings;
    generating an editable output data comprising the first untranslated text, the first layout information, the second untranslated text, and the second layout information;
    translating the untranslated text from each of the regions into a translated text by:
        submitting the translation list to a translator as a single instruction;
        receiving a translation of the non-repeated text strings as a single output from the translator; and constructing a translation map that maps the untranslated text from each of the regions to the translation of the non-repeated text strings;
editing the output data to include the translation list and the translation map;
inserting the translated text into the output data by:
obtaining the region list, the translation list, and the translation map;
determining which of the regions in the region list include an element of the translation list; and
for each region including an element of the translation list, using the translation map to replace the first and the second untranslated texts with the corresponding translated text from the translation map; and
formatting, using the first layout information and the second layout information, the output data to generate and output the translated electronic document comprising the translated text and a second layout that is identical to the first layout.

2. The method of claim 1, wherein
the translated electronic document further comprises the first untranslated text.

3. The method of claim 2, wherein
the first untranslated text is included in the translated electronic document as an annotated comment bubble.

4. The method of claim 2, wherein
the first untranslated text is included in the translated electronic document as an annotated text that is marked for deletion.

5. The method of claim 1, further comprising:
generating, using the first layout information, an editable untranslated electronic document comprising the first untranslated text and the first layout, wherein
the editable untranslated document is output with the translated electronic document.

6. The method of claim 1, wherein
the first layout information includes any one layout information selected from a group consisting of:
a shape;
a width;
a height;
a relative position of the first region in the input image;
a number of rows;
a number of columns;
a font;
a text attribute;
a line spacing;
a margin;
a text direction; and
a wrap type.

7. The method of claim 1, wherein
the second layout information includes any one layout information selected from a group consisting of:
a shape;
a width;
a height;
a relative position of the second region in the input image;
a number of rows;
a number of columns;
a font;
a text attribute;
a line spacing;
a margin;
a text direction; and
a wrap type.

8. A non-transitory computer readable medium (CRM) storing computer readable program code for generating an editable translated electronic document from an input image of an original document with a first layout, the computer readable program code causes a computer to:
obtain the input image using a camera or a scanner to image the original document;
segment the input image to generate regions including a first region comprising first untranslated text and a second region comprising a second untranslated text;
generate a region list that includes each of the regions;
extract, using an image recognition algorithm, untranslated text and layout information from each of the regions, where the first untranslated text and a first layout information are extracted from the first region and the second untranslated text and a second layout information are extracted from the second region;
processing the untranslated text from each of the regions to create a translation list of non-repeated text strings, where identical text strings that are repeated in the untranslated text of all the regions are consolidated into a single element of the translation list and each element of the translation list is one of the non-repeated text strings;
generate an editable output data comprising the first untranslated text, the first layout information, the second untranslated text, and the second layout information;
translate the untranslated text from each of the regions into a translated text by:
submitting the translation list to a translator as a single instruction;
receiving a translation of the non-repeated text strings as a single output from the translator; and
constructing a translation map that maps the untranslated text from each of the regions to the translation of the non-repeated text strings;
edit the output data to include the translation list and the translation map;
inserting the translated text into the output data by:
obtaining the region list, the translation list, and the translation map;
determining which of the regions in the region list include an element of the translation list; and
for each region including an element of the translation list, using the translation map to replace the first and the second untranslated texts with the corresponding translated text from the translation map; and
format, using the first layout information and the second layout information, the output data to generate and output the translated electronic document comprising the translated text and a second layout that is identical to the first layout.

9. The CRM of claim 8, wherein
the translated electronic document further comprises the first untranslated text.

10. A system for generating an editable translated electronic document from an input image of an original document with a first layout, the system comprising:
a memory; and
a processor coupled to the memory, wherein the processor:
obtains the input image using a camera or a scanner to image the original document;
segments the input image to generate regions including a first region comprising first untranslated text and a second region comprising a second untranslated text;

generate a region list that includes each of the regions;
extracts, using an image recognition algorithm, untranslated text and layout information from each of the regions, where the first untranslated text and a first layout information are extracted from the first region and the second untranslated text and a second layout information are extracted from the second region;
processing the untranslated text from each of the regions to create a translation list of non-repeated text strings, where identical text strings that are repeated in the untranslated text of all the regions are consolidated into a single element of the translation list and each element of the translation list is one of the non-repeated text strings;
generates an editable output data comprising the first untranslated text, the first layout information, the second untranslated text, and the second layout information;
translates the untranslated text from each of the regions into a translated text by:
    submitting the translation list to a translator as a single instruction;
    receiving a translation of the non-repeated text strings as a single output from the translator; and
    constructing a translation map that maps the untranslated text from each of the regions to the translation of the non-repeated text strings;
edits the output data to include the translation list and the translation map;
inserts the translated text into the output data by:
    obtaining the region list, the translation list, and the translation map;
    determining which of the regions in the region list include an element of the translation list; and
    for each region including an element of the translation list, using the translation map to replace the first and the second untranslated texts with the corresponding translated text from the translation map; and
formats, using the first layout information and the second layout information, the output data to generate and output the translated electronic document comprising the translated text and a second layout that is identical to the first layout.

11. The system of claim 10, wherein the translated electronic document further comprises the first untranslated text.

\* \* \* \* \*